United States Patent
Mehrseresht

(10) Patent No.: US 10,529,077 B2
(45) Date of Patent: Jan. 7, 2020

(54) SYSTEM AND METHOD FOR DETECTING INTERACTION

(71) Applicant: CANON KABUSHIKI KAISHA, Tokyo (JP)

(72) Inventor: Nagita Mehrseresht, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 15/847,416

(22) Filed: Dec. 19, 2017

(65) Prior Publication Data

US 2019/0188866 A1    Jun. 20, 2019

(51) Int. Cl.
*G06K 9/00* (2006.01)
*G06T 7/246* (2017.01)
(Continued)

(52) U.S. Cl.
CPC .......... *G06T 7/248* (2017.01); *A63B 24/0062* (2013.01); *G06K 9/6256* (2013.01);
(Continued)

(58) Field of Classification Search
CPC .............. G06T 7/248; G06T 7/292; G06T 2207/10016; G06T 2207/10024; G06T 2207/30224; G06T 2207/30228; G06T 2207/30232; G06T 11/001; G06T 2207/10056; G06T 2207/10064; G06T 2207/20221; G06T 2207/30004; G06T 2207/30024; G06T 5/50; G06T 7/0014; A63B 24/0062; G06K 9/6256;
(Continued)

(56) References Cited

U.S. PATENT DOCUMENTS

| | | | |
|---|---|---|---|
| 2015/0178953 A1* | 6/2015 | Gao | G06F 17/2765 345/681 |
| 2017/0083748 A1* | 3/2017 | Zhou | G06K 9/4671 |
| 2019/0073538 A1* | 3/2019 | Ashani | G06K 9/00711 |

OTHER PUBLICATIONS

Udo Feuerhake, "Recognition of Repetitive Movement Patterns—The Case of Football Analysis", ISPRS International Journal of Geo-Information 2016, 5.11, pp. 1-10, Published: Nov. 9, 2016.
(Continued)

*Primary Examiner* — Xin Jia
(74) *Attorney, Agent, or Firm* — Canon U.S.A., Inc. IP Division

(57) ABSTRACT

A system and method of detecting an interaction between a plurality of objects. The method comprises receiving tracking information for the plurality of objects in a scene; generating a plurality of frames, each of the plurality of frames comprising an activation for each of the plurality of objects and representing a relative spatial relationship between the plurality objects in the scene determined from the received tracking information, the frames encoding properties of the objects using properties of the corresponding activations; determining, using a trained neural network, features associated with the plurality of objects from the generated plurality of frames using the activations and the relative spatial relationship between the objects, the features representing changes in the relative spatial relationship between the objects over time relating to the interaction; and detecting time localization of the interaction in the plurality of frames using the determined features.

19 Claims, 11 Drawing Sheets

(51) Int. Cl.
*G06T 7/292* (2017.01)
*G06K 9/62* (2006.01)
*A63B 24/00* (2006.01)
*G06N 3/04* (2006.01)
*G06N 3/08* (2006.01)

(52) U.S. Cl.
CPC ......... *G06K 9/6267* (2013.01); *G06N 3/0445* (2013.01); *G06N 3/08* (2013.01); *G06T 7/292* (2017.01); *G06T 2207/10016* (2013.01); *G06T 2207/10024* (2013.01); *G06T 2207/30224* (2013.01); *G06T 2207/30228* (2013.01); *G06T 2207/30232* (2013.01)

(58) Field of Classification Search
CPC ...... G06K 9/6267; G06N 3/08; G06N 3/0445; G01N 21/64; G01N 21/6458; H04N 9/43
See application file for complete search history.

(56) References Cited

OTHER PUBLICATIONS

Heng Wang, et al., "Action Recognition by Dense Trajectories", CVPR 2011—IEEE Conference on Computer Vision & Pattern Recognition, Jun 2011, Colorado Springs, United States. IEEE, pp. 3169-3176, 2011.

Dan Oneata, et al., "Efficient action localization with approximately normalized fisher vectors", Proceedings of the IEEE Conference on Computer Vision and Pattern Recognition, pp. 2545-2552, 2014.

Gurkirt Singh, et al., "Untrimmed Video Classification for Activity Detection: submission to ActivityNet Challenge", arXiv:1607.01979 [cs], Jul. 12, 2016.

Zheng Shou, et al., "Temporal Action Localization in Untrimmed Videos via Multi-Stage CNNs", IEEE Conference on Computer Vision and Pattern Recognition, pp. 1049-1058, 2016.

Victor Escorcia, et al., "DAPs: Deep Action Proposals for Action Understanding", Computer Vision—ECCV 2016, pp. 768-784, Oct. 2016.

Takamasa Tsunoda, et al., "Football action recognition using hierarchical LSTM", to appear in Int. workshop on computer vision in sports at CVPR 2017.

Joseph Redmon, et al., "You Only Look Once: Unified, Real-Time Object Detection", 2016 IEEE Conference on Computer Vision and Pattern Recognition (CVPR), Las Vegas, NV, pp. 779-788, 2016.

Tran Du, et al.,"Learning spatiotemporal features with 3D convolution networks", in ICCV 2015, pp. 4489-4497, 2015.

Karen Simonyan, et al., "Two-stream convolutional networks for action recognition in videos", in the NIPS 2014.

* cited by examiner

SYSTEM AND METHOD FOR DETECTING INTERACTION

TECHNICAL FIELD

The present invention relates to a method, system and apparatus of identifying the time localization of interactions between a plurality of objects based on the spatial location of plurality of interacting objects. The spatial location of each object may be in the form of tracking meta-data. The present invention also relates to a method, system and apparatus of classifying interactions into one or more of predefined interaction classes.

BACKGROUND

Detecting from video footage when two or more people interact with each other, or when a person interacts with an object of interest is a technically important and yet challenging task. Detecting interaction from video data has application in areas such as sport analytics, surveillance, safety and security monitoring.

In the present disclosure, the term action refers to an act of doing something in order to make something happen, and the term interaction refers to a reciprocal act to an action involving more than one person or a person and one or more objects. For example, in a soccer game, players interact with ball, for example by kicking the ball with a player's foot, or trapping the ball with a player's chest, and players also interact with each other by passing the ball between them.

For instant interactions, that is when the duration of the interaction is smaller than that discernible by a monitoring system under consideration, such as someone hitting an object, determining "time localisation" of the interaction refers to determining the time at which the interaction occurs. For continuing interactions, that is when the duration of the interactions is non-trivial, such as someone holding an object, determining time localisation of the interaction refers to determining the time at which the interaction starts and ends. The determined time localisation may be in the form of relative time of the interaction compared to a reference starting time, such as the start of recording. When a corresponding video recording of the scene also exists, time localisation may also be expressed as the frame number at which the interaction occurs. In the present disclosure, determining time localisation of an interaction is referred to as 'temporal localisation'.

Action or interaction detection may also include classifying the interaction. Classification (also called categorisation) is the task of assigning a class label to an input instance of the action or interaction. For example, 'successful pass' and 'failed pass' are two examples of class labels in a sport analysis application, and 'meeting', 'passing an object' and 'separating' are examples of class labels in a surveillance application. Action or interaction classification accuracy typically improves significantly if the temporal localisation is accurate, since irrelevant background content could behave as noise and adversely affect the accuracy of pre-trained models. Similarly, when some parts of the action or interaction are not included in the input instance due to imperfect segmentation and localisation, the classification accuracy would typically be lower.

Temporal localisation of actions and interactions is a challenging task, as interactions often occur quickly. Detecting interactions in video recording of scenes is also challenging due to a limited field of view of each camera capturing the scenes, substantial occlusions, and visual similarity of different actions and interactions, especially when fine-grain detection is required. Fine-grain interaction detection refers to temporal localisation and/or classification of interactions that are visually similar, such as distinguishing between a successful pass, and a failed pass in a soccer game.

A known technique for temporal action or interaction localisation in video contents trains an action/interaction classifier using pre-segmented interaction instances. At recall/test stage, the pre-trained classifier is applied to fixed length video segments and often overlapping temporal segments of the video. The pre-trained classifier localises the action using greedy localisation techniques such as non-maximum suppression. Often multiple cameras are required to cover a large scene, such as a rugby field or a soccer field, or a fairly large surveillance site. Existing temporal localisation from video content techniques would be relatively slow and inefficient to use in such multi-camera systems, as the video generated by each camera is generally processed independently, and the final detections generated by fusing multiple single camera view detections. In addition to computational inefficiency, the existing temporal interaction localisation solutions can have low accuracy as the whole interaction may not be visible in any single video.

An alternative known technique for temporal action/interaction localisation, also from video contents, is based on a proposal-classification approach. Instead of applying a pre-trained classifier in sliding window (the technique described above), proposal-classification techniques include an action proposal part. The action proposal part is usually a deep artificial neural network trained to generate class agnostic action or interaction candidates. The generated candidates are further evaluated with a pre-trained classifier for the action or interaction classes of interest. Existing proposal-classification approaches are designed and generally applied to single view videos. Computationally efficient extension of existing proposal-classification techniques to multiple camera views is not developed or published. Additionally, action proposal techniques are usually designed for visually distinct actions (e.g., running, vs. high jump, vs. climbing, vs. golf swing), and the techniques are not efficient or accurate for temporal localisation of fine-grained interactions.

Yet another known technique for action or interaction localisation from videos uses a temporal sequence model such as a neural network with recurrent architecture, for example a long-short term memory (LSTM) network. However, computationally efficient extension of temporal sequence model techniques to multiple camera views is not developed or published. Further, temporal sequence model techniques are not efficient for fine-grain interaction localisation.

Thus, there is a need for efficient and accurate interaction localisation technique which can be used when visual content is not available, as well as in systems with multiple cameras covering a large scene.

SUMMARY

It is an object of the present invention to substantially overcome, or at least ameliorate, one or more disadvantages of existing arrangements.

The present invention relates to a method of detecting time localisation in an interaction between a plurality of objects.

One aspect of the present disclosure provides a method of detecting an interaction between a plurality of objects, the method comprising: receiving tracking information for the plurality of objects in a scene, the tracking information tracking the objects over a period of time; generating a plurality of frames, each of the plurality of frames comprising an activation for each of the plurality of objects and representing a relative spatial relationship between the plurality objects in the scene determined from the received tracking information, the frames encoding properties of the objects using properties of the corresponding activations; determining, using a trained neural network, features associated with the plurality of objects from the generated plurality of frames using the activations and the relative spatial relationship between the objects, the features representing changes in the relative spatial relationship between the objects over time relating to the interaction; and detecting time localization of the interaction in the plurality of frames using the determined features.

According to another aspect, the properties of the plurality of objects are encoded using a size of the activation.

According to another aspect, the properties of the plurality of objects are encoded using a shape of the activation.

According to another aspect, the properties of the objects are encoded using a colour of the activation.

According to another aspect, the plurality of frames are associated with a number of channels and the properties of the plurality of objects are encoded by mapping the corresponding activation to one or more of the channels.

According to another aspect, the number of channels is three, represented by red, green and blue channels, such that the plurality of frames provides a visual representation of the plurality of objects, the visual representation being devoid of visual characteristics of the objects.

According to another aspect, the method further comprises determining the tracking information of the plurality of objects from video data capturing the scene.

According to another aspect, generating the plurality of frames comprises determining a mapping between video data of the scene and dimensions of the frames, and converting a location of each of the plurality of objects in the scene to a location in the dimensions of the frames.

According to another aspect, the method further comprises determining properties of each of the plurality of objects from the video data using an automated supervised search method.

According to another aspect, determining the features associated with the plurality of objects relates to determining interaction scores associated with the plurality of frames over the time period.

According to another aspect, determining the features associated with the plurality of objects relates to determining interaction scores associated with the plurality of frames over the time period, and detecting the time localisation comprises determining peaks in the interaction scores over a predefined threshold.

According to another aspect, the method further comprises classifying the interaction by determining a play agent of the interaction.

According to another aspect, classifying the interaction further comprises determining attributes of the play agent.

According to another aspect, the scene relates to a playing field, the plurality of objects relate to players of a team sport and a ball, and the interaction relates to interaction between the players and ball.

Another aspect of the present disclosure provides a method of detecting time localisation in an interaction between a plurality of objects, the method comprising: receiving tracking information for the plurality of objects in a scene, the tracking information tracking the objects over a time period; generating a plurality of frames, each frame containing a visual representation of the received tracking information for each of the plurality of objects; determining, using a trained neural network, features associated with the interaction from the generated plurality of frames using pixel information representing the relative spatial relationship between the plurality of objects; and detecting time localization in the interaction between the plurality of objects using the determined features.

Another aspect of the present disclosure provides a non-transitory computer readable storage medium storing program instructions for detecting an interaction between a plurality of objects, the program comprising: code for receiving tracking information for the plurality of objects in a scene, the tracking information tracking the objects over a period of time; code for generating a plurality of frames, each of the plurality of frames comprising an activation for each of the plurality of objects and representing a relative spatial relationship between the plurality objects in the scene determined from the received tracking information, the frames encoding properties of the objects using properties of the corresponding activations; code for determining, using a trained neural network, features associated with the plurality of objects from the generated plurality of frames using the activations and the relative spatial relationship between the objects, the features representing changes in the relative spatial relationship between the objects over time relating to the interaction; and code for detecting time localization of the interaction in the plurality of frames using the determined features.

Another aspect of the present disclosure provides apparatus for detecting an interaction between a plurality of objects, comprising: a processor; and a memory device storing a software program for directing the processor to perform a method comprising the steps of: receiving tracking information for the plurality of objects in a scene, the tracking information tracking the objects over a period of time; generating a plurality of frames, each of the plurality of frames comprising an activation for each of the plurality of objects and representing a relative spatial relationship between the plurality objects in the scene determined from the received tracking information, the frames encoding properties of the objects using properties of the corresponding activations; determining, using a trained neural network, features associated with the plurality of objects from the generated plurality of frames using the activations and the relative spatial relationship between the objects, the features representing changes in the relative spatial relationship between the objects over time relating to the interaction; and detecting time localization of the interaction in the plurality of frames using the determined features.

Another aspect of the present disclosure provides a system comprising: a plurality of image capture devices for capturing video of a scene over a time period; a processor; and a memory device storing a software program for directing the processor to perform a method comprising the steps of: receiving the video data of the scene; determining tracking information for a plurality of objects in the scene from the video data; generating a plurality of frames, each of the plurality of frames comprising an activation for each of the plurality of objects and representing a relative spatial relationship between the plurality objects in the scene determined from the tracking information, the frames encoding properties of the objects using properties of the corresponding activations; determining, using a trained neural network, features associated with the plurality of objects from the generated plurality of frames using the activations and the relative spatial relationship between the objects, the features representing changes in the relative spatial relationship between the objects over time relating to an interaction between the plurality of objects; and detecting time localization of the interaction in the plurality of frames using the determined features.

Other aspects are also provided.

BRIEF DESCRIPTION OF THE DRAWINGS

One or more example embodiments of the invention will now be described with reference to the following drawings, in which.

DETAILED DESCRIPTION INCLUDING BEST MODE

Figure 1:
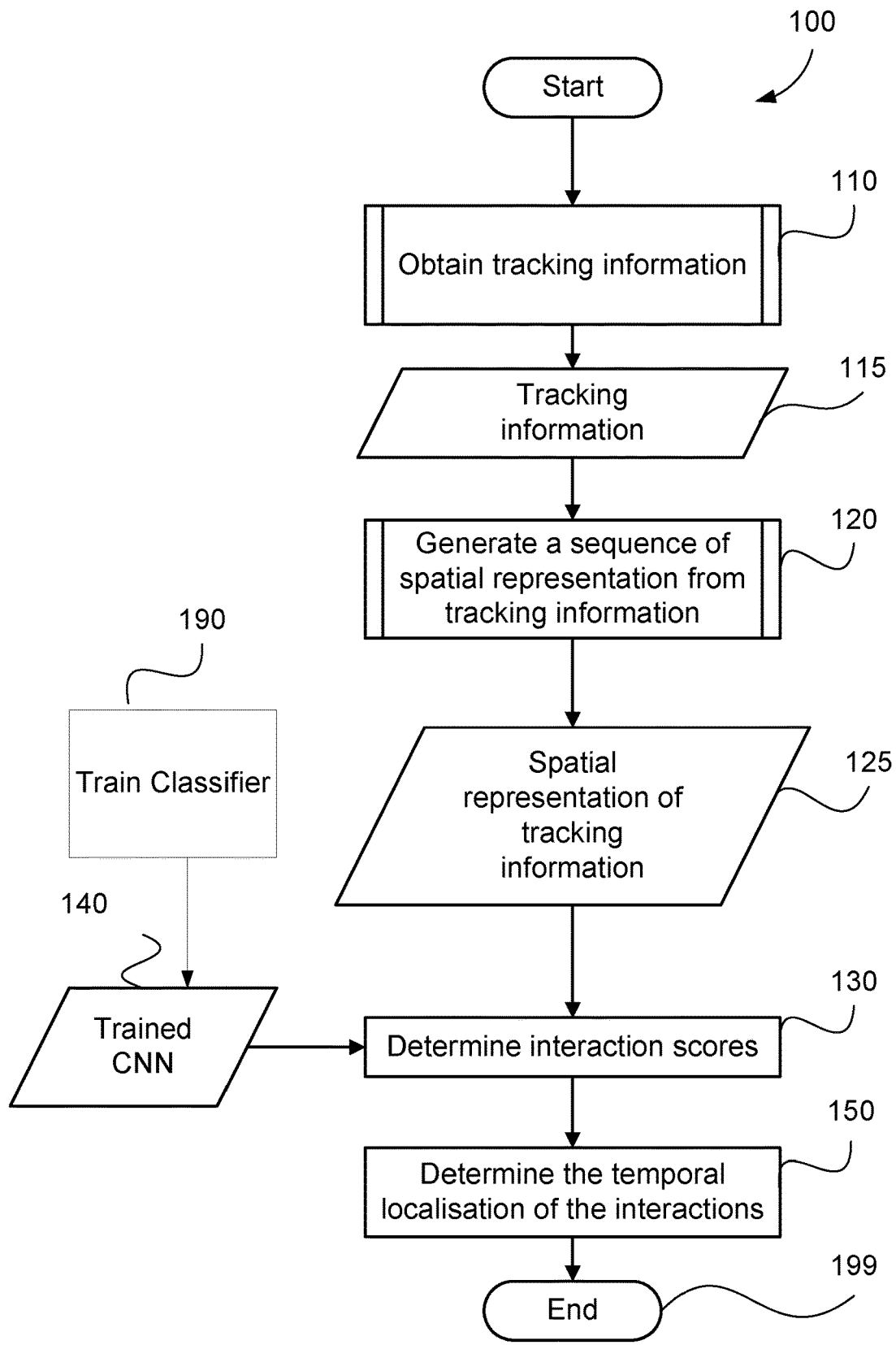
FIG. 1 shows a flow chart of a method of detecting time localization of an interaction.

Where reference is made in any one or more of the accompanying drawings to steps and/or features, which have the same reference numerals, those steps and/or features have for the purposes of this description the same function(s) or operation(s), unless the contrary intention appears.

Currently, using video and temporally localising an action or interaction using a classifier is the most common approach to action or interaction localisation. The classifier utilizes spatio-temporal features derived from an image sequence capturing the pose of the person as he or she is performing the action or interaction. Occlusion, viewpoint variation and visual similarity of the pose of the person as he or she is performing different action or interaction are some of the challenges of using visual content for action or interaction localisation. Tracking meta-data can be another useful source of information for interaction recognition, particularly when interaction affects the moving trajectory of an object (for example a person's kick changes the trajectory of a moving ball, or two people change their previous trajectory to greet each other). Using tracking meta-data directly as an input to a generic classifier, however, is challenging, as the number of objects being tracked often varies at different point in time. Also, a classifier which could detect a specific type of interaction, regardless of the location at which the interaction is occurring, and the scale of the tracking meta-data is desirable. Current known interaction detection techniques do not teach how to achieve invariance to scale and location when using tracking meta-data.

The arrangements described relate to systems and methods of detecting temporal localisation in an interaction between a number of objects in captured video data. The arrangements described relate to generating a spatial representation of a plurality objects in a scene from tracking information, and identifying the temporal localization of interactions between a plurality of objects based on the spatial location of plurality of interacting objects. The spatial representation relates to locations and encodes meta-data identifying properties of the object, but does not include the actual visual features of the objects.

Figure 10A:
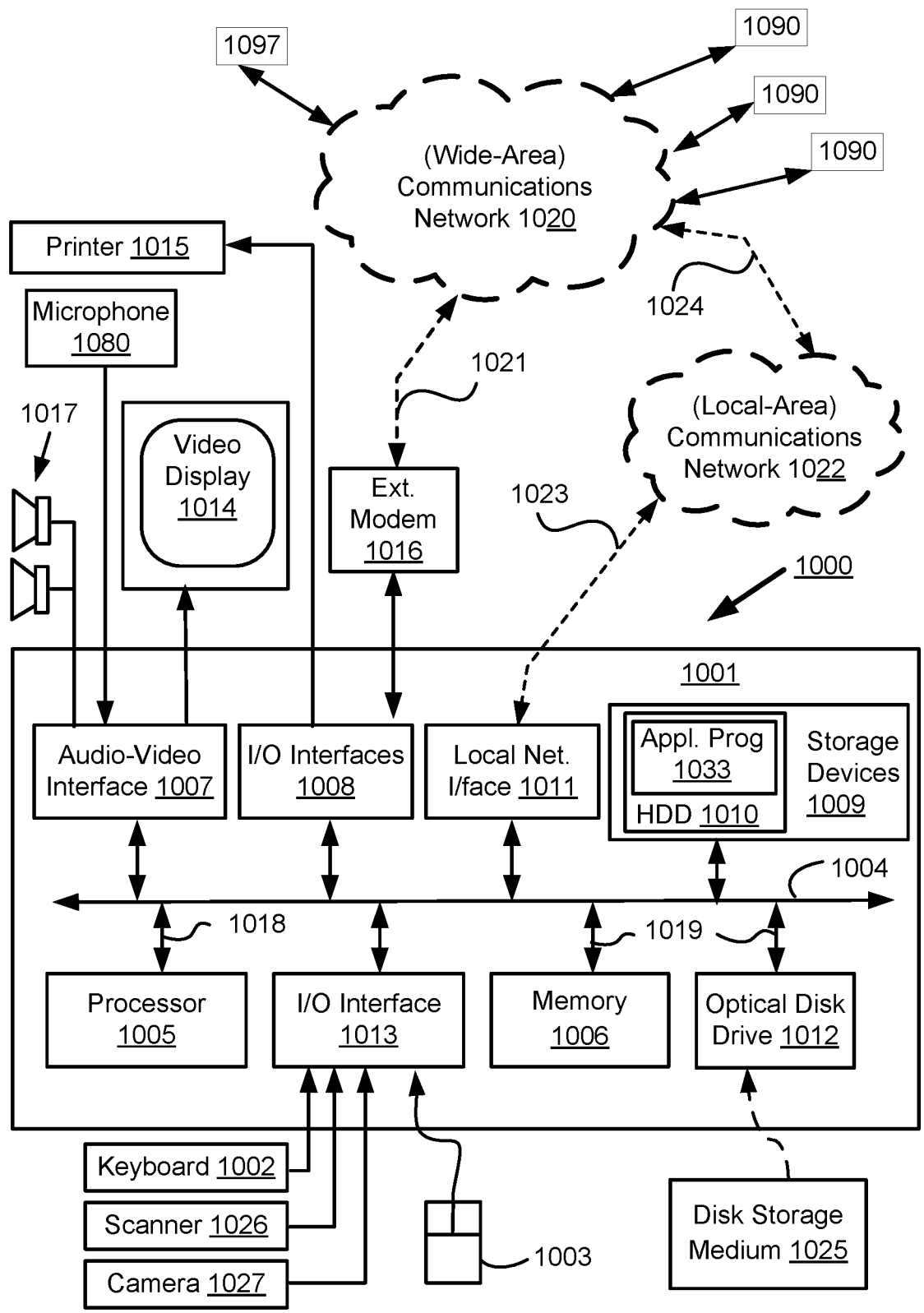
FIGS. 10A and 10B form a schematic block diagram of a general purpose computer system upon which arrangements described can be practiced.
Figure 10B:
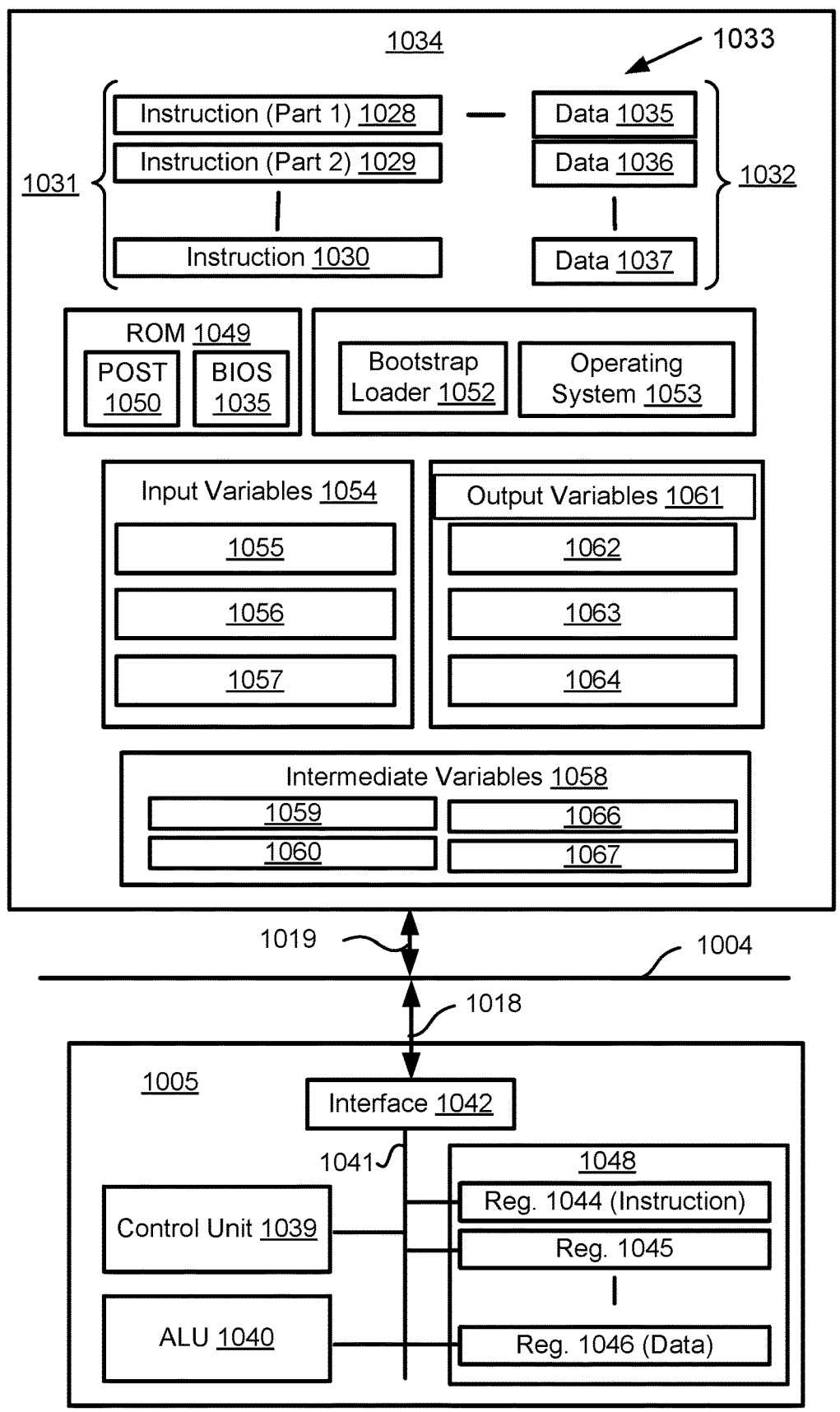

FIGS. 10A and 10B depict a general-purpose computer system 1000, upon which the various arrangements described can be practiced.

As seen in FIG. 10A, the computer system 1000 includes: a computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

One or more cameras 1090 can be in communication with the computer module 1001 via the network 1020. The cameras 1090 can be any image capture devices suitable for capturing video data of a scene, for example of a playing field or a surveillance area. The cameras 1090 are typically networked cameras surrounding the scene. In other arrangements, the cameras 1090 may be at least partially integral to the module 1001, or the module 1001 may be a camera. The arrangements described can be used for real-time determination of action or interaction during live video coverage of the scene, or for determination of action or interaction after an event has occurred. Alternatively, one or more tracking devices 1097 can be in communication with the computer module 1001 to provide tracking information. The tracking devices 1097 can relate to spatial positioning devices such as wearable tracking devices containing one or more of a GPS tracking module, an accelerometer, a gyroscope, a magnetometer or a portable radio tracking module.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth® wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disk™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or like computer systems.

The described methods of detecting an interaction may be implemented using the computer system 1000 wherein the processes of FIGS. 1-3 and 8 to be described, may be implemented as one or more software application programs 1033 executable within the computer system 1000. In particular, the steps of the methods of FIGS. 1-3 and 8 are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1000 from the computer readable medium, and then executed by the computer system 1000. A computer readable medium having such software or computer program recorded on the computer readable medium is a computer program product. The use of the computer program product in the computer system 1000 preferably affects an advantageous apparatus for identifying an interaction.

The software 1033 is typically stored in the HDD 1010 or the memory 1006. The software is loaded into the computer system 1000 from a computer readable medium, and executed by the computer system 1000. Thus, for example, the software 1033 may be stored on an optically readable disk storage medium (e.g., CD-ROM) 1025 that is read by the optical disk drive 1012. A computer readable medium having such software or computer program recorded on it is a computer program product. The use of the computer program product in the computer system 1000 preferably affects an apparatus for identifying an interaction.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1005 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The described arrangements use input variables 1054, which are stored in the memory 1034 in corresponding memory locations 1055, 1056, 1057. The described arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

a fetch operation, which fetches or reads an instruction 1031 from a memory location 1028, 1029, 1030;

a decode operation in which the control unit 1039 determines which instruction has been fetched; and an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 1-3 and 8 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The methods of determining an interaction may alternatively be implemented in dedicated hardware such as one or more integrated circuits performing the functions or sub functions of the methods described. Such dedicated hardware may include graphic processors, digital signal processors, or one or more microprocessors and associated memories FIG. 1 shows a flow chart of a method 100 of determining the time localisation of an interaction of interest. The method 100 reflects one implementation of a temporal localisation method for determining an interaction.

The method 100 is typically implemented as one or more modules of the application 1033, stored in the memory 1006 and controlled under execution of the processor 1005.

The method 100 starts at an obtaining step 110. The step 110 executes to obtain the tracking information of objects in a scene. The tracking information consists of coordinates of tracking objects of interest during a time period of interest relative to a reference point in the scene (for example on the field). For example, tracking information may consist of the coordinates of the locations of the players and ball relative to the centre of the sport field during the game, with temporal frequency of $\frac{1}{30}^{th}$ of second (30 Hz). While many known image tracking systems can operate at a frame frequency of 30 Hz, some GPS systems can operate at 10 Hz.

The tracking information of step 110 can be obtained by manual annotations, using spatial positioning devices such as wearable tracking devices containing one or more of a GPS tracking module, an accelerometer, a gyroscope, a magnetometer or a portable radio tracking module. Alternatively, the tracking information could be obtained through processing of multi-view videos of the objects, for example from video data captured by the cameras 1090. The video data comprises images of a scene (for example a playing field) including a number of objects (such as players and a ball). The tracking data relates to movement of the objects in the captured scene. Wearable tracking devices often come with software which would provide an application program interface (API) for accessing and processing tracking information.

Figure 2:
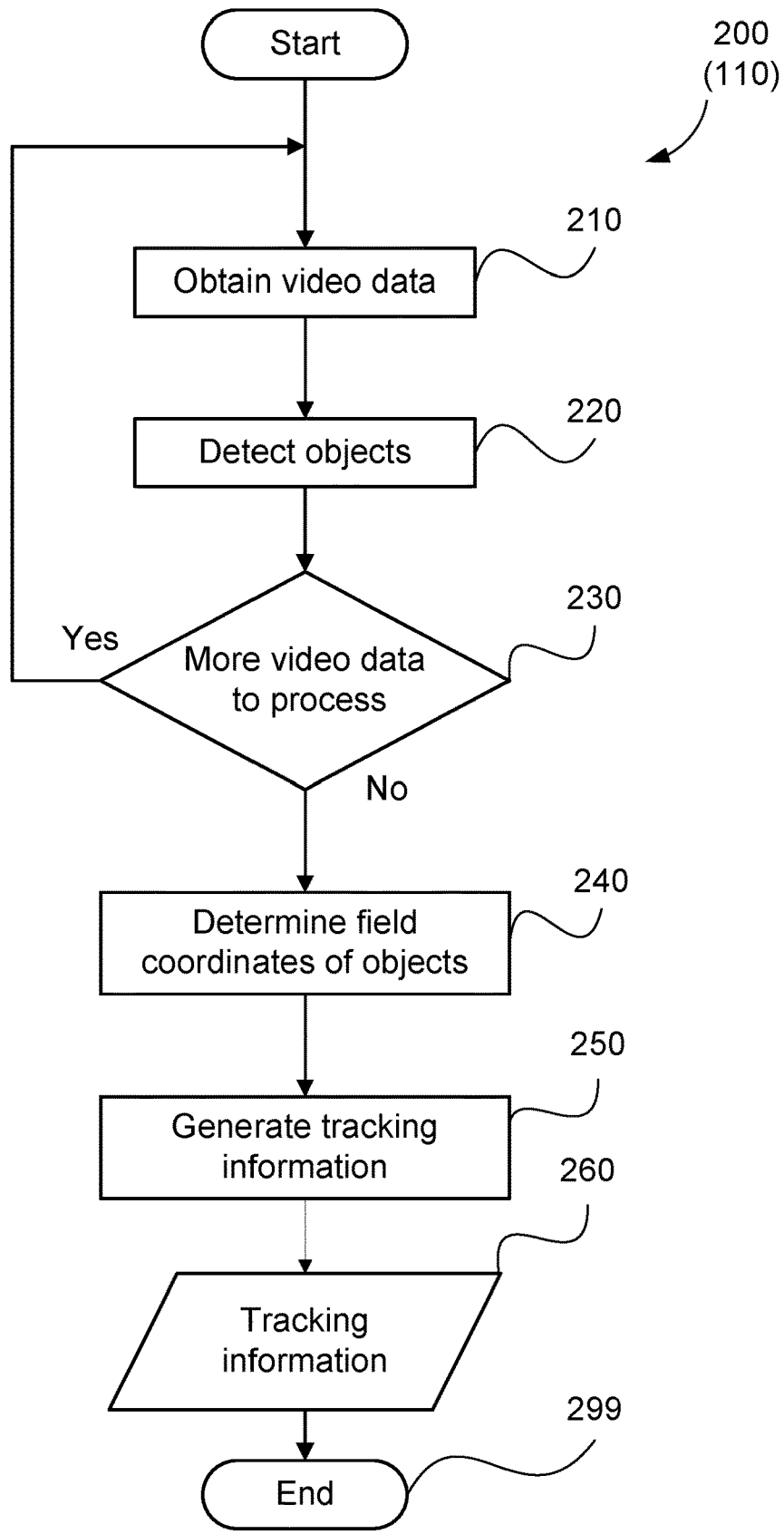
FIG. 2 shows a flow chart of a method of obtaining tracking information used in FIG. 1.

FIG. 2 shows an exemplary method 200 of obtaining tracking information from multiple video cameras, as implemented at step 110 of FIG. 1. The method 200 is typically implemented as one or more modules of the application 1033, stored in the memory 1006 and controlled under execution of the processor 1005.

The multi-view tracking method 200 starts with video data obtaining step 210. The video data obtained from each of the cameras 1090 is a temporal sequence of RGB images of a fixed image width and image height, and each image has corresponding recording timestamp. The video data comprises a number of video frames and relates to a particular time period or time span. The method 200 proceeds from step 210 to an object detecting step 220. The object detection step 220 detects objects of interest from the video data received at step 210. For example, when analysing video data of a soccer game, the objects of interest may include the players, the umpire(s) and the ball. There are many known techniques for object detection from video data, such as regression with single neural network method (Shaoqing Ren, Kaiming He, Ross Girshick, and Jian Sun. 2015. Faster R-CNN: towards real-time object detection with region proposal networks. In *Proceedings of the 28th International Conference on Neural Information Processing Systems* (NIPS'15), C. Cortes, D. D. Lee, M. Sugiyama, and R. Garnett (Eds.). MIT Press, Cambridge, Mass., USA, 91-99 for example), object recognition with a region proposal method (Shaoqing Ren, Kaiming He, Ross Girshick, and Jian Sun. 2015. Faster R-CNN: towards real-time object detection with region proposal networks. In *Proceedings of the 28th International Conference on Neural Information Processing Systems* (NIPS'15), C. Cortes, D. D. Lee, M. Sugiyama, and R. Garnett (Eds.). MIT Press, Cambridge, Mass., USA, 91-99 for example), a deformable part model (P. Felzenszwalb, R. Girshick, D. McAllester. Cascade Object Detection with Deformable Part Models. Proceedings of the IEEE CVPR 2010 for example), or object detection based on regression based region proposal as described (J. Redmon, S. Divvala, R. Girshick and A. Farhadi, "You Only Look Once: Unified, Real-Time Object Detection," 2016 *IEEE Conference on Computer Vision and Pattern Recognition* (CVPR), Las Vegas, N V, 2016, pp. 779-788).

Multiple objects can be detected in execution of the object detection step 220. Each detected object is assigned an identifier, and a subset of the pixels that correspond to the object are labelled with the object's identifier.

The method 200 progresses under execution of the processor 1005 from step 220 to a check step 230. To capture all the objects of interest in a large area, like a soccer field, multiple cameras are often needed, for example the cameras 1090. Step 230 operates to decide if more video data is available for obtaining and processing to detect objects, for example received from another camera of the cameras 1090. If more video data is available ("Yes" at step 230), the method 200 returns to step 210. The video data obtained from each different camera may be processed in parallel. Alternatively, in non-real-time processing, video data received from each of camera may be divided into portions and each portion of video data processed in parallel.

If there is no more video data to process ("No" at step 230), the method 200 proceeds to a determining step 240. Step 240 determines the field coordinates of the objects in each timestamp. The cameras 1090 must have been calibrated in advance to implement step 240. The corresponding field coordinates of the objects can be determined using back projection, for example using an OpenCV camera calibration and 3D reconstruction toolset. Processing each frame or portion of video data provides an estimation of which of the objects appears in which coordinates of the scene (such as relative to the centre of the playing field) and the corresponding time. Video data from at least two distinct viewpoints (for example at least two cameras at different positions relative to a field) is required to locate an object in three dimensional (3D, that is (x, y, z)) coordinates. If video data from at least two viewpoints is not available other constraints such as information about ground location or height of known objects must be provided to the application 1033.

The method 200 progresses under execution of the processor from step 240 to a generating step 250 to determine tracking information from the video data of step 210. Step 250 combines the estimations of the possible locations of each object generated independently from each video data at step 240 to form aggregated tracking information. Execution of step 250 also applies outlier rejection methods such as RANSAC, which is also available in OpenCV, for example. Resultant generated tracking information 260 is in frame number order, or corresponding timestamp order.

Figure 7:
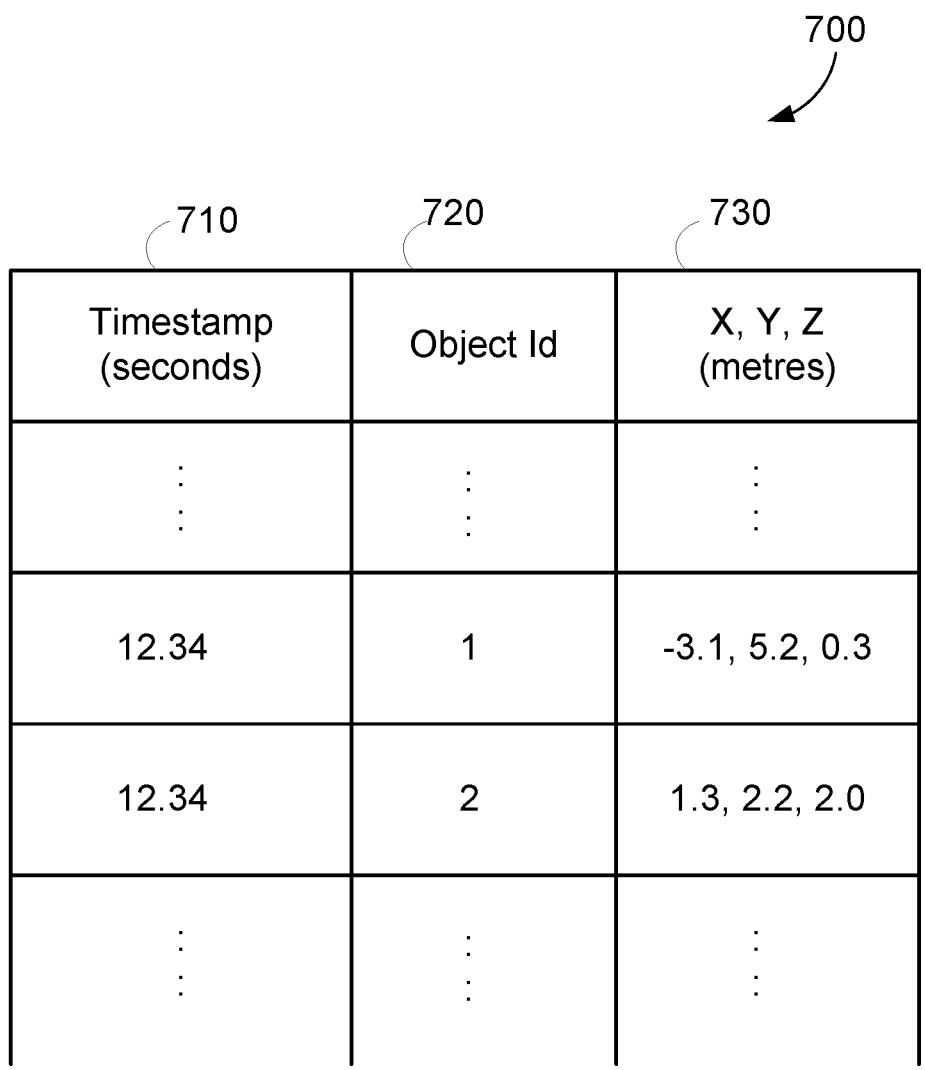
FIG. 7 illustrates a sample of tracking information.

An example 700 of tracking information, corresponding to the tracking information 260, is illustrated in FIG. 7. A first column 710 of the tracking information 700 relates to timestamp, a second column 720 relates to an object identifier. A third column 730 relates to the field coordinates (location) of the object. In other arrangements, the column 710 can be the frame number corresponding to a particular timestamp. This tracking information 260 relates to tracking information 115 shown in FIG. 1.

Returning to FIG. 1, the method 100 continues under execution of the processor 1005 from step 110 to a generating step 120. The step 120 generates a temporal sequence of spatial representations 125 from the tracking information obtained at step 110 as now described in more details with respect to FIG. 3. The temporal sequence of spatial representations 125 is a sequence of frames, each frame containing a spatial representation of the received tracking information. Each frame can be a data frame with more one or more channels. For example, a frame of the sequence 125 contains relative position information for each object in the frame and information identifying each object, as described below. As described in relation to step 120 and FIG. 2, each of the frames comprises an activation for each of the objects and represents a relative spatial relationship between the objects in the scene determined from the received tracking information, and encodes properties of the objects using properties of the corresponding activations.

Figure 3:
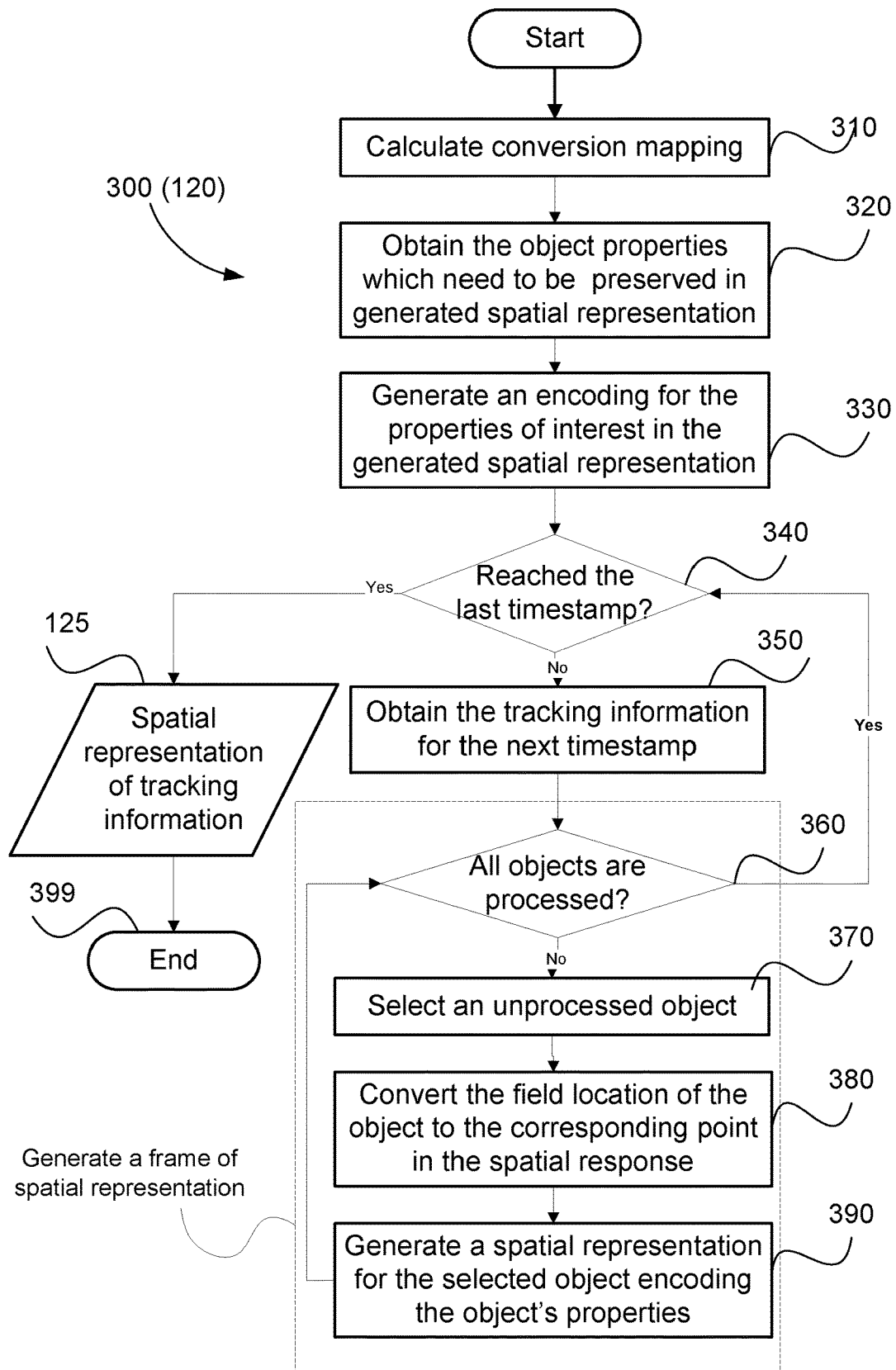
FIG. 3 shows a flow chart of a method of generating a sequence of spatial representation from tracking information used in FIG. 1.

FIG. 3 shows a method 300 of generating a temporal sequence of spatial representations from tracking information, as implemented at step 120 of FIG. 1.

The method 300 starts at a conversion mapping step 310. The step 310 operates to determine a mapping which converts a 'field region of interest' to the spatial representation 125, which has a required resolution. The 'field region of interest' refers to part(s) of the physical world which is of interest for a particular use-case. For example, in a sport analytics use-case, the field region of interest could be a sporting field and regions around the sporting filed with a margin of 5 meters. In an example surveillance application, the 'field region of interest' could be a premises at which a current surveillance system is deployed. The determined mapping would include shift and scaling which needs to be applied to each coordinate so that the region of the interest on the field could be represented as spatial representation with the required resolution.

The required resolution is typically predetermined. Width and height of the resolution of interest are determined based on the convolutional neural network to be used at step 130, described below. The resolution also relates to a number of channels. The number of channels depends on a level of properties of the objects to be encoded into the spatial representation, as described in relation to step 330 below.

The required resolution relates to the dimensions of the frames of the spatial representation 125. The dimensions of the frames are expressed in terms of height and width and are represented in units similar to pixels, also referred to herein as "elements".

The conversion mapping can be determined by calculating a homography between the field region of interest and the spatial representation of the field of interest with the required resolution, for example. The homography is determined while specifying the correspondence of 4 points on the field to the matching 4 points on the spatial representation. An example is to map a rectangular region with width of 13 (thirteen) meters and length of 30 (thirty) meters and centre of tracking coordinate at the centre of the region and positive horizontal coordinate (i.e., x) toward right, and positive vertical coordinate (i.e., y) toward top, to spatial representation. with resolution of 127 by 255 elements or pixels and centred on top left. Table 1 includes four (4) corresponding points as examples.

TABLE 1

Example point correspondence

| | (x, y) location on the field (as specified by tracking information) | Location on the spatial representation with resolution of 127 by 255 elements or pixels |
|---|---|---|
| Top centre | (0, 15) | [128, 1] |
| Bottom centre | (0, −15) | [128, 127] |
| Bottom left | (−15, −15) | [1, 127] |
| Top left | (−15, 15) | [1, 1] |

The determined homography H can be used to map any point on the field at coordinate (x, y) to the corresponding point (x', y') on the spatial representation using the following scaling:

$$X = [x, y] \quad \text{Equation (1)}$$

$$\tilde{X} = [x, y, 1]' \quad \text{Equation (2)}$$

$$X_{im} = H * \tilde{X} \quad \text{Equation (3)}$$

$$x' = \text{round}\left(\frac{X_{im}(1)}{X_{im}(3)}\right) \quad \text{Equation (4)}$$

$$y' = \text{round}\left(\frac{X_{im}(2)}{X_{im}(3)}\right) \quad \text{Equation (5)}$$

In Equations (1) to (5), [.]' represents transposing a vector or matrix, and converts the row vector X to column vector $\tilde{X}$. $X_{im}(1)$, $X_{im}(2)$ and $X_{im}(3)$ refer to the first, second and third elements in $X_{im}$, respectively. X refers to allocation in the playing field, whereas $X_{im}$ refers to a corresponding coordinate in the spatial representation. With the example mapping specified in Table 1, the corresponding homography matrix (approximately) is:

$$H = \begin{bmatrix} 4.8568 & 0 & 73.4258 \\ 0 & -5.56 & 36.7129 \\ 0 & 0 & 0.5736 \end{bmatrix} \quad \text{Equation (6)}$$

Using the example of Equation (6) a point with field coordinates of (2, 2) would be mapped to an activation centred at element (145, 45) of the spatial representation. An activation is generated by setting the values of some neighbouring points to a non-zero, and generally large value (e.g., 127 if each point is represented as an 8-bit character). An activation is generated for each of the objects in the scene.

The method 300 continues under execution of the processor 1005 from step 310 to an obtaining step 320. The property obtaining step 320 obtains the properties of interest of the one or more objects which need to be preserved in the generated spatial representation 125. The properties of interest are typically use-case dependent. In one arrangement, the properties of interest are specified by the human users. However, in another arrangement, an automated supervised search method can also be used to evaluate the usefulness of different properties. For example, for sport analytic use-cases, properties such as object types (e.g., ball, puck, human), team identification (e.g., a player of the Home or the Away team), and roles (such as goal-keeper, referee, etc.) can be important. Similarly, for activity analysis in security use-cases, object types (e.g., car, human, and suitcase) and roles (e.g., staff personnel, security guard, and visitor) can be considered as properties of interest.

The method 300 proceeds under execution of the processor 1005 from step 320 to an encoding step 330. The property encoding step 330 generates an encoding for the properties of interest. An example encoding maps different properties to different channels of the spatial representation. However, a combination of different channels could also be used. The property encoding step 330 may also map or encode some of the properties of interest to at least one of a shape, a colour and a value or size (intensity) of generated activations. For example, objects of type 'human' may generate a 5 by 5 element (or pixel) square activation centred at the (x', y') point as determined using Equation (1), while objects of type 'ball' are represented as a diamond also centred at (x', y'). Other attributes such as confidence in detection or tracking identification can be encoded as variation in the value (i.e., intensity) of the activation. When multiple activations overlap, the values of the multiple activations are added. The value of the activation can relate to a size of the activation relative to the overall frame and relative to activations for objects with other properties.

The number of channels in the spatial representation can depend on at least one of the number of properties of interest, the number of objects detected, and properties of the CNN. If the number of channels used for generating the spatial representation 125 is three, the spatial representation can be visualised by assigning the three channels to red, green and blue (R, G and B) channels as is normally used for representing images. In such cases the spatial representation 125 can be called a visual representation, and can be examined by visualising the representation as a sequence of frames or as a video.

In one implementation, the number of object types (or classes) e.g., human and ball in a scene is equal to the number of channels, such that each object type is assigned a different channel. Other implementations may have more object types (classes) than channels. The objects can be encoded on the available channels based on type and desired attributes. For example objects relating to players of a home team on channel 1, players of an away team on channel 2, a ball on channel 3, and referee and other objects of interest on channels 1 and 2.

In an example use-case of detecting time allocation of interactions in indoor soccer games, the size of the spatial representation 125 at each timestamp is a 150 by 150 element frame by 3 channels. For each player of the Home team, the activation is a 5 by 5 square centred at (x', y') in the first channel, and for each player of the Away team, the activation is a 5 by 5 element square centred at (x', y') in the second channel. For all the other detected humans not belonging to the Home or the Away teams, the activation is a 5 by 5 element square centred at (x', y') in both first and second channels. For each detected ball object (maximum of one ball at each timestamp, but the ball could be out of the region of interest at some timestamps), the activation is a diamond of diameter 5 centred at (x', y') in the third channel. Irrespective of whether the spatial representation is a "visual representation" of the objects in the scene, the spatial representation does not reflect the actual visual characteristics of the objects. For example, the activations for a person are devoid of the actual visual appearance of the person.

Figure 4:
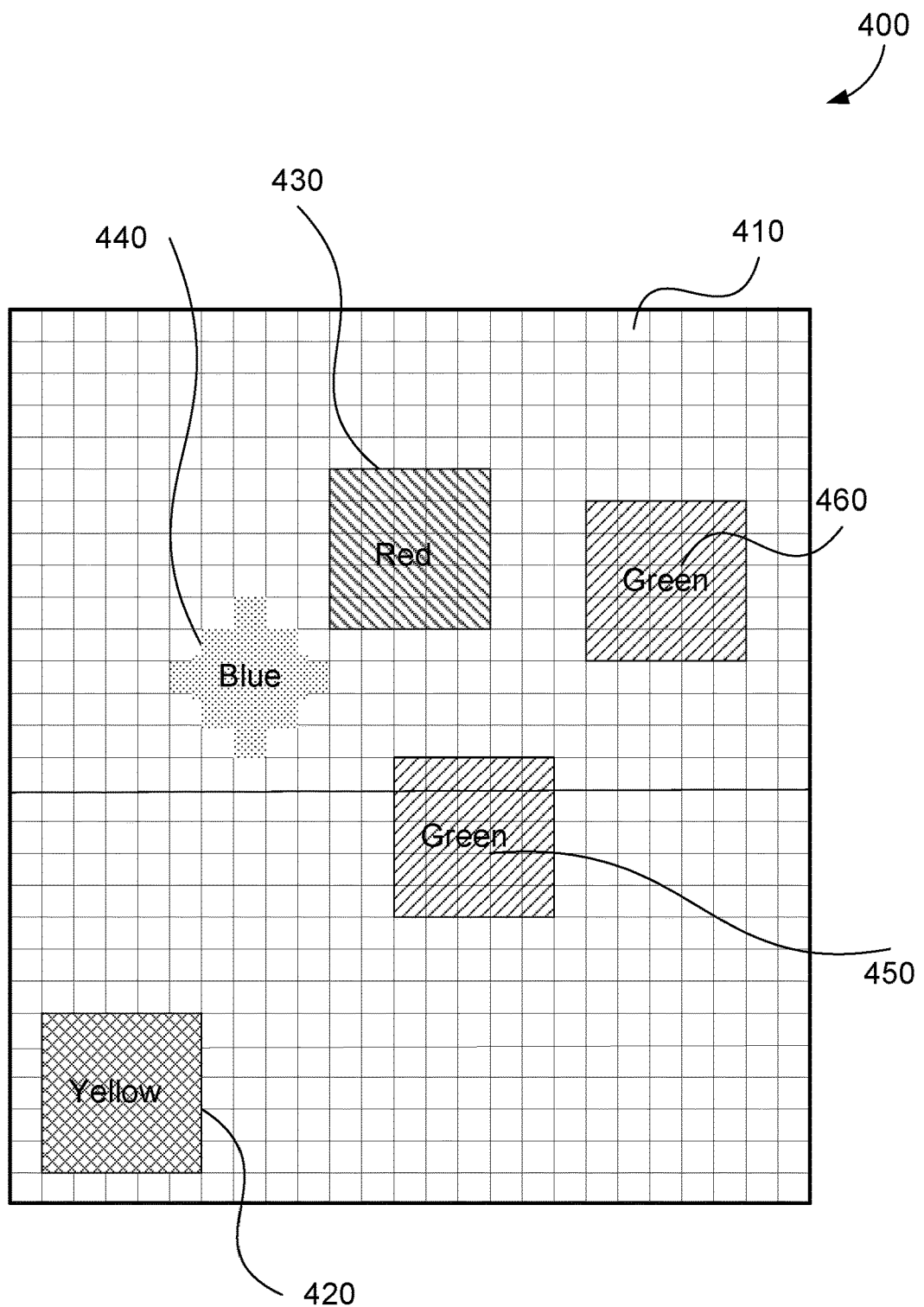
FIG. 4 illustrates an example spatial representation of the tracking information for a single timestamp.

FIG. 4 shows a subset of one frame 400 of a spatial representation of tracking information at a particular timestamp. The frame 400 is for a spatial representation that is a "visual representation" for the use-case of time localisation of interactions in an indoor soccer game with the setting described above for encoding different properties of interest. In the example of FIG. 4, the first, second and third channels of the spatial representation 400 are mapped to red, green and blue channels in an image respectively, and the spatial representation 400 is visualised as an image frame. A red square 430 corresponds to a player of Home team while green squares 450 and 460 correspond to two players of the Away team respectively. A yellow square 420 corresponds to a person which has not been associated to the Home or the Away team. A blue diamond 440 corresponds to the ball. The centre of each of the activations 420, 430, 440, 450 and 460 is determined from the object's location on the field as specified by tracking information and using the homography mapping equations specified in equations (4) and (5). The size of each activation can vary from implementation to implementation depending on the resolution selected and/or depending on the number of objects to avoid overlaps. Each activation can occupy more or less elements (for example pixels when number of channels is three (3)), and could be in other shape formations (e.g. cross, circle . . . etc.). As shown in FIG. 4, the frame 400 represents a relative spatial relationship between the objects 420, 430, 440, 450 and 460. The properties of the objects are encoded based upon encoding determined in step 330.

Using the above example of an indoor soccer use-case, at each timestamp, the spatial representation 125 has three (3) channels, and each element of the representation 400 (for example a element 410) has a 3-tuple value (one value for each channel). Additionally, the temporal sequence of spatial representations is a temporal sequence of 3D tensors. However, in another embodiment, the goalkeeper of each team or the umpire could be assigned to a separate channel. In that embodiment, each element, such as the element 410, is a 5-tuple value. When the number of channels in the spatial representation 125 is more than three (3), the spatial representation cannot be visualised as an image trivially. However, each channel can be visualised as a grey-scale image independently.

The method 300 progresses under execution of the processor 1005 from step 330 to a check step 340. Step 340 checks that tracking information of all timestamps has been converted to a spatial representation. If all timestamps have not been processed ("No" at step 340), the method 300 progresses to an obtaining step 350. Step 350 executes to get or obtain the tracking information for the next unprocessed timestamp.

The method 300 continues under execution of the processor 1005 from step 350 to a check step 360. For each timestamp, step 360 checks that all objects detected in the tracking information associated with that timestamp have been processed to generate a corresponding spatial representation. If there is an unprocessed object ("No" at step 360), the method 300 continues to a selecting step 370. Step 370 selects an unprocessed object and the method 300 continues to a converting step 380. Step 380 converts the object's field location as specified in the tracking information 115 to the corresponding location in spatial representation using the conversion mapping H determined in step 310, and using the set of Equations (1) to (5).

The method 300 progresses from step 380 to a generating step 390. Step 390 generates an activation response for the selected object based on the properties of the object selected in the property selection step 320 and the corresponding encodings as determined in the property encoding step 330. An activation response is generated by setting the values of the corresponding elements to a high value (for example 127 if each element is represented as an 8-bit char), or a non-zero value if some other properties such as tracking identification number or the confidence in the detection could be encoded as the magnitude of the activation response. The points are set to a high value for a particular radius or shape around the centre-point of the activation, for example to form a square shape or a diamond shape. For example, step 330 generates an encoding for the properties of interest of the object (such as team identifier and object type determined from the tracking data) and step 390 applies the encoding of a red square of a determined size to the object 430 of FIG. 4.

The steps 360 to 390 are repeated until all objects at the time-stamp selected at step 350 are processed and a frame of spatial representation comprising activations for each object in that timestamp is generated. As described above, each frame contains a spatial representation of the received tracking information for each of the objects in a single time-stamp.

If at step 360, all objects are determined to be processed ("Yes" at step 360), the method 300 returns to step 340. If the last timestamp is determined to have been reached at step 340 ("Yes" at step 340), the method 300 ends. The method 300 outputs the spatial representation of tracking information 125.

Referring back to FIG. 1, the method 100 progresses under execution of the processor 1005 from step 120 to a score generating step 130. The score generating step 130 takes the sequence of spatial representations at plurality of timestamps (which is a plurality of frames, each frame corresponding to a timestamp) as input and outputs a sequence of interaction scores associated with the spatial representation 125. The interaction scores are generated using a convolutional neural network (CNN). The convolutional neural network is pre-trained for interactions of interest. The information included in the spatial representations and used by the convolutional neural network relates to position, size, and colour of the activation representing the objects. Correspondingly, position, size, and colour of the activation representing the objects relates to the relative location of the objects on the field, as well as the type and other attributes of interest of each object.

A convolutional neural network is a type of deep feed-forward artificial neural network. A convolutional neural network consists of a set of nodes arranged in to an input layer, an output layer and multiple hidden (intermediate) layers. Nodes of consecutive layers are connected with weighted edges. Except for pooling units, each (processing)

unit in an artificial neural network applies a non-linearity function such as Sigmoid, tan h, or rectifier function to the weighted sum of the function's inputs to generate the output of the unit.

Sigmoid, tan h and rectified functions are shown in Equations (7) to (9) respectively:

$$f_{sigmod}(x) = \frac{1}{1+e^{-x}} \qquad \text{Equation (7)}$$

$$\tanh(x) = \frac{1-e^{-2x}}{1+e^{-2x}} \qquad \text{Equation (8)}$$

$$f_{rectifier}(x) = \max(0, x) \qquad \text{Equation (9)}$$

A pooling unit performs a form of non-linear sampling. For example, a max pooling unit with filter size of 2×2 selects the maximum of the 4 values in the pooling unit's receptive field, and the output of an average pooling unit is the average of values in the pooling unit's receptive field. The hidden layers of a convolutional neural network can be convolutional, pooling or fully connected layers. Convolutional layers apply a convolution operation to the input, passing the result to the next layer. The receptive field of convolution units are often small e.g., 3 by 3, and convolution units in the same layer have the same weights. Convolution units in the same layer having the same weights is commonly referred to as weight sharing. In other words, convolutional nodes in the same layer share weights. Units in fully connected layers have connections to all units in the previous layer. In other words, the receptive field of each unit in a fully connected layer includes all the units in the previous layer. Different units in the same fully connected layer can have different weights, that is fully connected nodes in the same layer do not share weights. A Softmax function is often used in the final, that is the output layer of neural network classifiers. Softmax loss is used for predicting a single class of K mutually exclusive classes. Each unit in the output layer of a convolutional neural network corresponds to a single class. Thus, if K mutually exclusive classes are of interest, the output layer of the convolutional neural network would have K units, and the output of each (output) unit is the likelihood of the input being an instance of the corresponding class.

Figure 9:
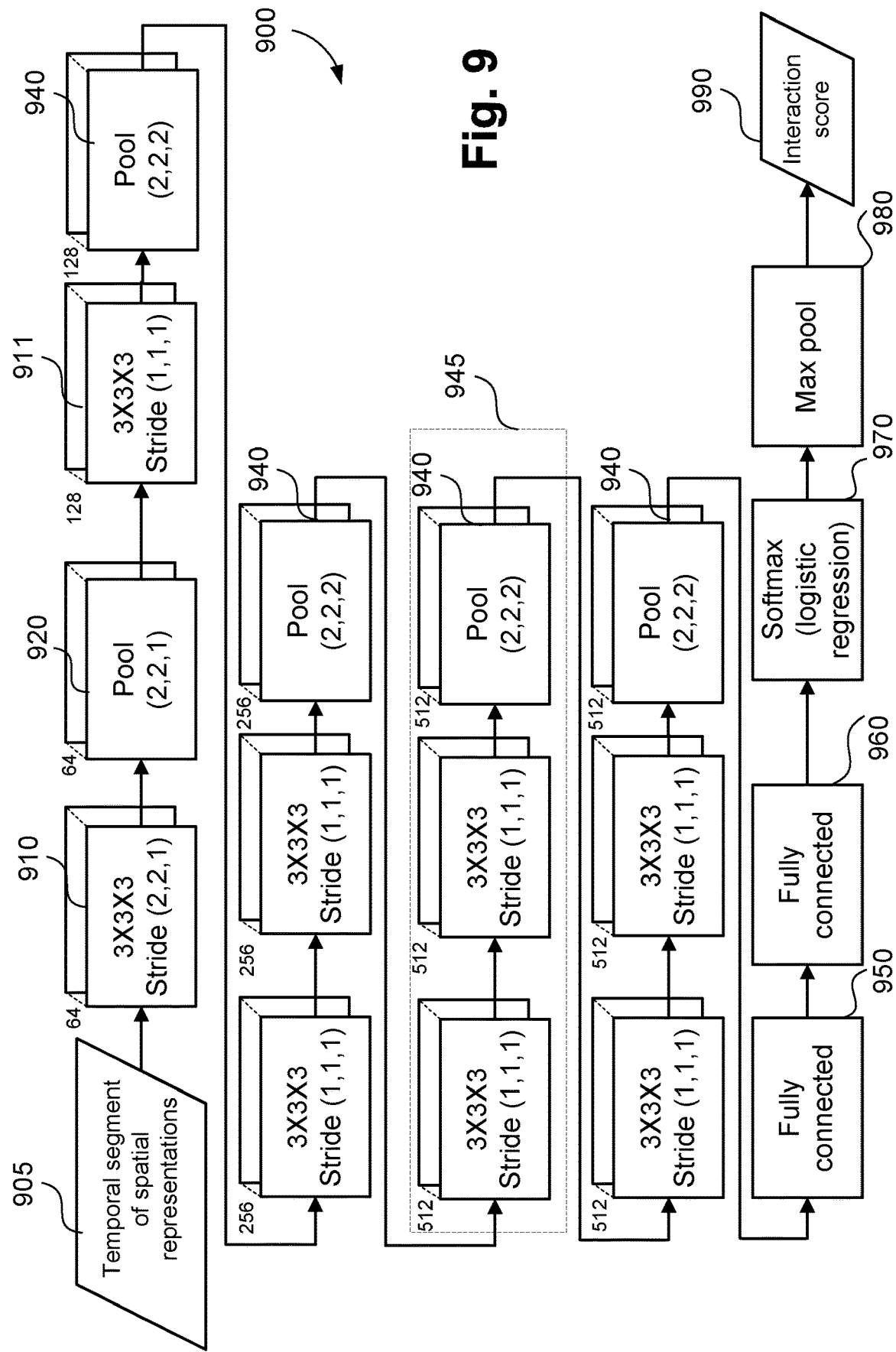
FIG. 9 illustrates an example convolutional neural network for generating interaction scores.

In one arrangement, the score generation step 130 uses a convolutional neural network with three dimensional (3D) convolution filters, as shown in FIG. 9. FIG. 9 shows a convolutional neural network 900. In one arrangement, an input 905 to the convolutional neural network is a segment of the sequence of spatial representations 125 containing spatial representation from 16 consecutive timestamps (16 frames). In the convolutional neural network 900 illustrated in FIG. 9, the convolution filters are c×3×3×3 tensors, where c is the number of channels in the previous layer. The convolutional neural network 900 has stride of ($v_1$, $v_2$, $v_3$) indicating convolution with the stride of $v_3$ over temporal dimension, and stride of $v_1$ and $v_2$ on the width and height of each frame of spatial representation (in a first convolution layer 910), or feature map of previous layers (in the subsequent convolution layers 911). In the example convolutional neural network 900 shown in FIG. 9, the convolution filters are applied with stride of 1 over temporal dimension Except for the first convolutional layer 910, which uses spatial stride of 2 by 2 on each frame of spatial representation, convolution operations in all the other convolutional layers (e.g., 911) of the convolutional neural network 900 are applied with the stride of 1 spatially and temporally.

The receptive field of each pooling unit is a single channel, and except for a first pooling layer 920, which only applies spatial pooling of 2 by 2, all the other pooling layers 940 apply spatial and temporal pooling of 2 by 2 by 2. A spatial pooling of 2 by 2, halves the resolution of the feature map by 2 in each dimension, and a spatiotemporal pooling of 2 by 2 by 2, also halves the size of the temporal dimension. The exemplary convolutional neural network 900 shown in FIG. 9 uses two fully connected layers 950 and 960 and, a Softmax layer 970. In the convolutional neural network 900, the fully connected layers 950 and 960 each have 4096 units. The exemplary convolutional neural network 900 illustrated in FIG. 9 is similar to the architecture described in "Learning spatiotemporal features with 3D convolution networks" by Tran et al., in ICCV 2015. The input 905 to the convolutional neural network 900, however, is different from the convolutional neural network input in Tran et al., ICCV 2015) paper as input 905 is not a sequence of natural images.

An alternative convolutional neural network could use different number of units in the fully connected layers. Using known techniques, a different set of meta-parameters for the architecture of the convolutional neural network can be chosen. The optimal convolutional neural network architecture for a given use-case, is often determined heuristically, by evaluating the performance of different architectures on a validation set from the use-case of interest.

When the number of mutually exclusive classes in the Softmax layer is 2 i.e., K=2, a generated interaction score 990 is the output of a logistic unit 970 corresponding to the foreground class, and there is no need for max-pooling operation 980. When the number of mutually exclusive classes in the Softmax layer is larger than 2, the max-pooling operation 980 is applied to all foreground interaction classes. Often 'no interaction' is considered as a separate background class. In such cases, the max-pooling operation 980 should only be applied to the scores of the foreground classes. In the present disclosure, foreground refers to any of the interaction classes of interest (e.g., 'receiving the ball', 'passing the ball' or 'holding the ball' in sport analytics use-cases and 'picking up a parcel', 'leaving a parcel behind', or 'two or more persons meeting' in security and surveillance use-cases), and background refers to 'no interaction' or any interaction which is not of interest for the corresponding use-case.

In an alternative arrangement, the input 905 to the convolutional neural network 900 is a temporal segment of the sequence of spatial representations containing 8 subsequent timestamps. In the alternative arrangement, the convolutional neural network 900 may use less number of pooling layers, or use a spatial pooling instead of spatio-temporal pooling. A convolutional neural network with less number of convolution layers may also be used. In one arrangement for the use-case of interaction localisation in indoor soccer, the accuracy of temporal localisation is not very sensitive to the meta-parameters defining the architecture of the convolutional neural network, such as the number of convolution layers, the sizes of the fully connected layers and small changes in the length of the spatial representation segment (e.g., similar accuracy could be achieved with segment size of 8 to 16 timestamps).

In an alternative arrangement, the score generation step 130 uses a two stream 2D convolutional neural network, similar to the network described in Simonyan and Zisserman in the NIPS 2014 paper titled "Two-stream convolutional networks for action recognition in videos".

The convolutional neural network used for generating interaction scores may need to be trained for the use-case of interest. In some implementations, the method 100 includes a training step 190. The training step generates the trained convolutional neural network 140. The step 190 is typically only implemented once, and the resultant trained convolutional neural network 140 is used in subsequent implementations for a particular scene or use-case. Training a convolutional neural network is relates to adjusting the weights of the weighted edges including the convolution filter parameters, weights of the fully connected layers and the Softmax parameters and is often done using a training process called backpropagation. Backpropagation is used with a gradient based optimisation such as stochastic gradient descent. Training a convolutional neural network using a training set is known. To generate a training set for the use-case of interest, tracking information (from some examples from the use-case of interest) is used together with corresponding ground truth annotations of the interactions of interest. The tracking information is converted to sequences of spatial representations using steps 110 and 120 of FIG. 1. The set of sequences of spatial representations together with associated ground truth annotations of interactions formed the training set for the convolutional neural network. Each training instance is a segment of spatial representation (for example with the temporal length of 16 timestamps) and the associated annotation of the interaction, or an annotation indicating a non-interaction segment. The convolutional neural network might be initialised with small random weights, or with weights from convolutional neural network trained for similar use-cases. Training of the convolutional neural network adjusts the weights by minimising the loss. Sigmoid cross-entropy (also called Softmax) loss is commonly used for classification.

Figure 5:
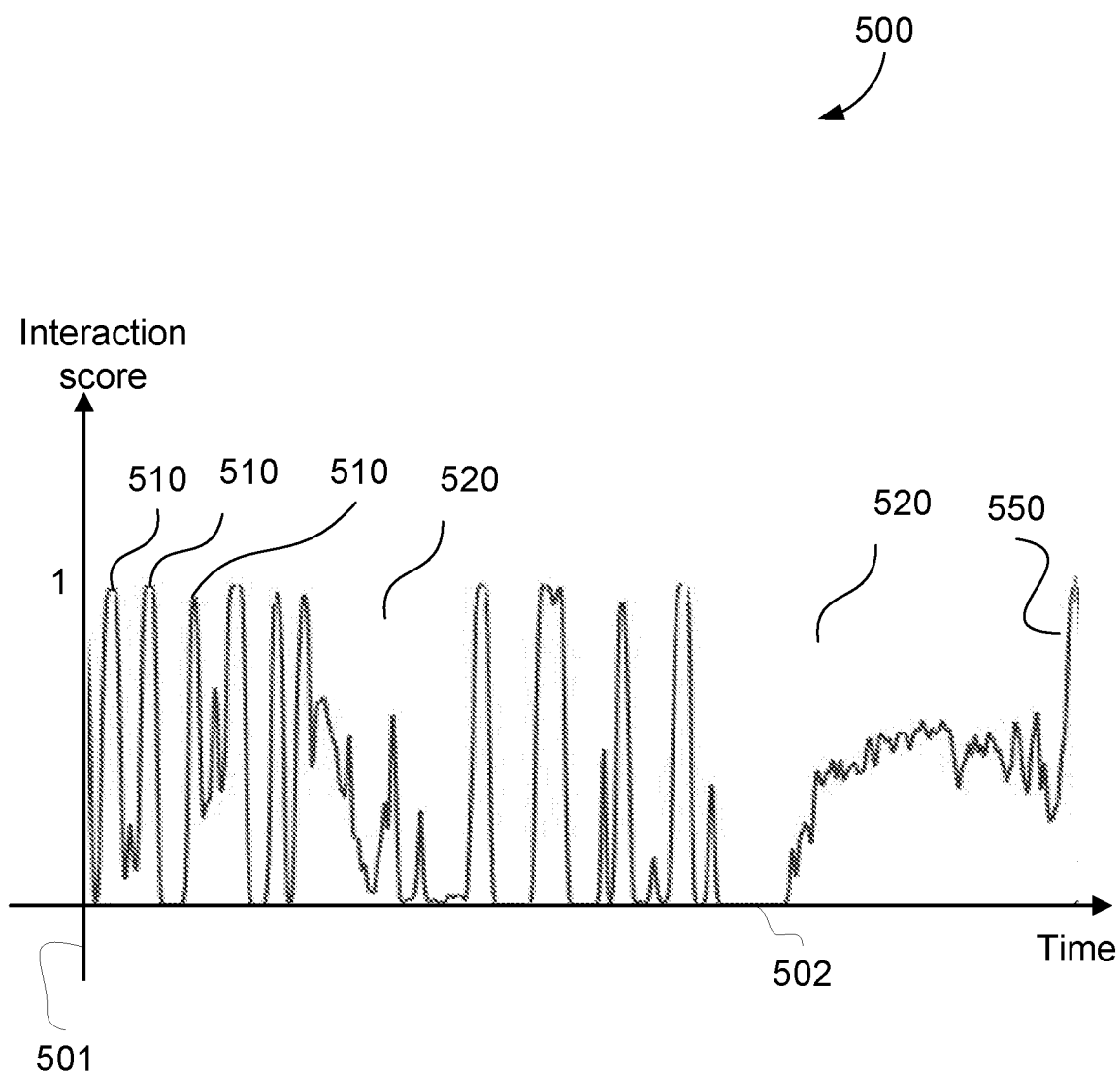
FIG. 5 illustrates interaction scores generated from spatial representations over multiple timestamps.

FIG. 5 shows a graph 500 for a temporal sequence of interaction scores generated for an exemplary application of temporal localisation of interactions in indoor soccer games. Every point of a curve 550 represents the interaction score 990 generated by processing a temporal segment 905 of the spatial representation 125. The vertical axis 501 represents the magnitude of the interaction score 990, and the horizontal axis 502 represents the time, at the centre of the temporal segment 905. The temporal sequence of interactions illustrated as the curve 550 is generated by selecting segments of spatial representation with a temporal step of one timestamp (i.e., using a temporal sliding window with step of one timestamp to select the temporal segment 905) and processing the selected temporal segment of spatial representation with a convolutional neural network similar to FIG. 9. A set of peaks 510 are associated with the occurred interactions. The neural network 900 is typically trained to produce peaks for specific interactions of interest. Preferably, a peak will be present for each interaction of interest in the video data. In FIG. 5 two prolonged intervals 520 in which the interaction score is relatively low (smaller or equal to 0.5) corresponds to the intervals in which the game has stopped as the ball is out of play.

In determining the interaction score using the convolutional neural network, the step 130 effectively identifies features associated with the objects from the spatial representation using the activations and the relative spatial relationship between the objects. Intermediate layers of the Convolution Neural Network (940-960) generate features which represent the changes in the relative spatial relationship between the objects over time relating to the interaction, effectively forming the interaction.

Referring to FIG. 1, the method 100 continues from step 130 to a temporal localisation step 150. Step 150 takes the interaction scores generated in step 130 (determined using a trained convolutional neural network 140), and determines the time localization of the interaction(s). Determining the time localization is achieved by finding the peaks in the temporal sequence of interaction scores which are larger than a predefined threshold, for example a threshold of 0.5. In one arrangement, the temporal locations of peaks are determined using a non-maximal suppression algorithm (NMS). The non-maximal suppression algorithm is a greedy algorithm and localises the peaks by sorting the interaction scores in descending order. For every selected maxima, the scores from timestamps closer than a predefined temporal radius (for example 7 timestamps) are ignored for the purpose of finding the next peaks. An alternative arrangement may use dynamic programming to globally optimise for the location of the peaks in the interaction scores.

Figure 6:
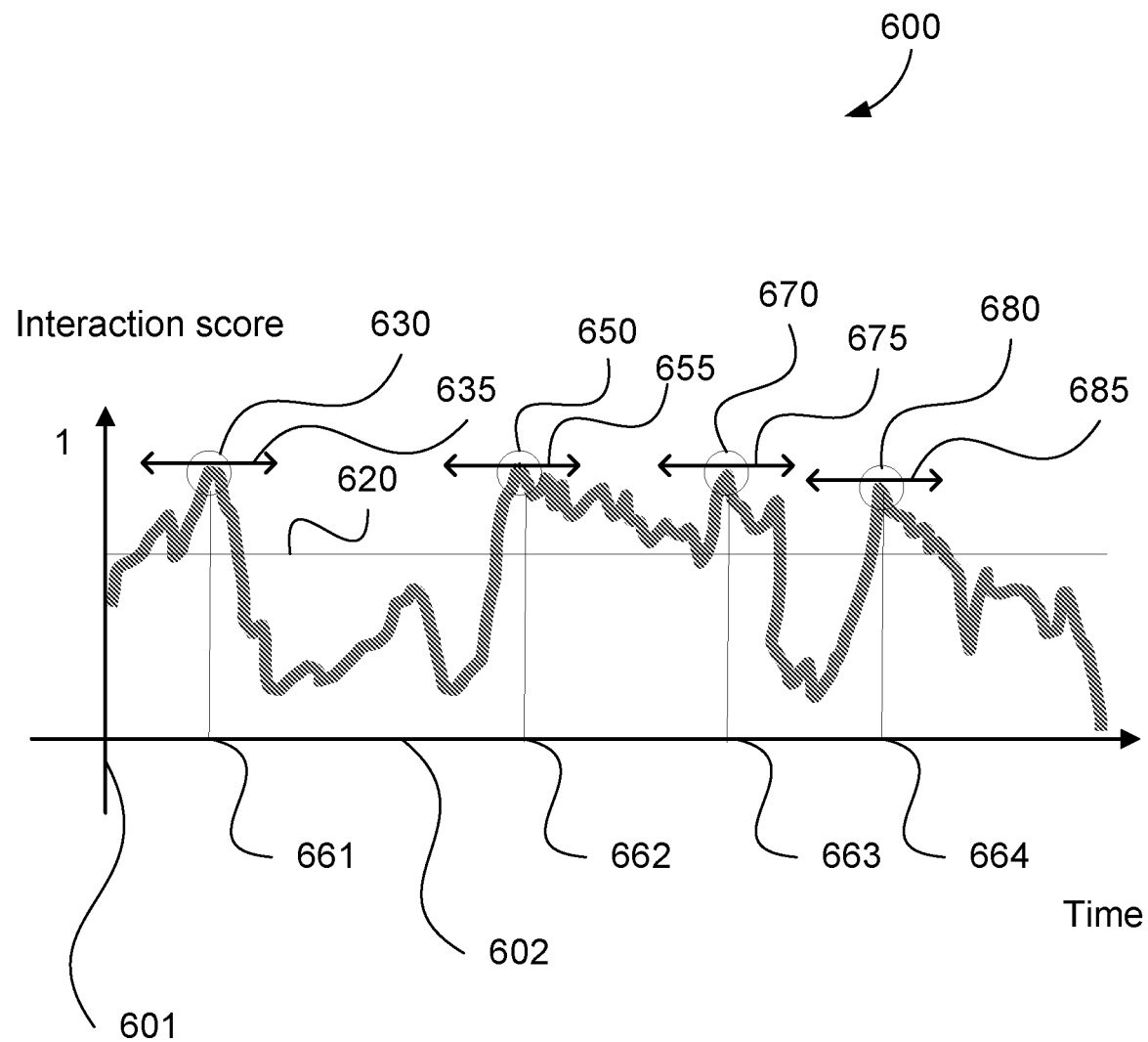
FIG. 6 illustrates a concept of extracting time localization of a play from the interaction scores.

FIG. 6 shows a graph 600 of interaction score (axis 601) versus time (axis 602). A threshold 620 is a predefined threshold used in the non-maximal suppression algorithm. Interaction scores below the threshold 620 are suppressed. The threshold 620 used in one exemplary indoor soccer game analysis embodiment is 0.6. The non-maximal suppression algorithm then selects the peak value of the interaction scores, shown as peak score 630, and suppresses a nearby interval 635. The non-maximal suppression algorithm then selects a next peak value 650 and suppresses a nearby interval 655. Similarly for next peaks 670, 680 the corresponding nearby intervals 675, 685 are suppressed. The length of the nearby intervals 635, 655, 675, 685 may be chosen to be equal to the frame length 905. The steps of select and suppress are repeated until all interaction score peaks above the threshold 620 are suppressed. All the interaction scores equal or below the threshold are also ignored. The output of the non-maximal suppression algorithm is the selected peaks. Four peaks are found in the example illustrated in FIG. 6. The time intervals 661-664 of the selected peaks are the time localization of the interactions. Upon determination of the peaks, the step 150 ends and the method 100 of FIG. 1 ends.

Figure 8:
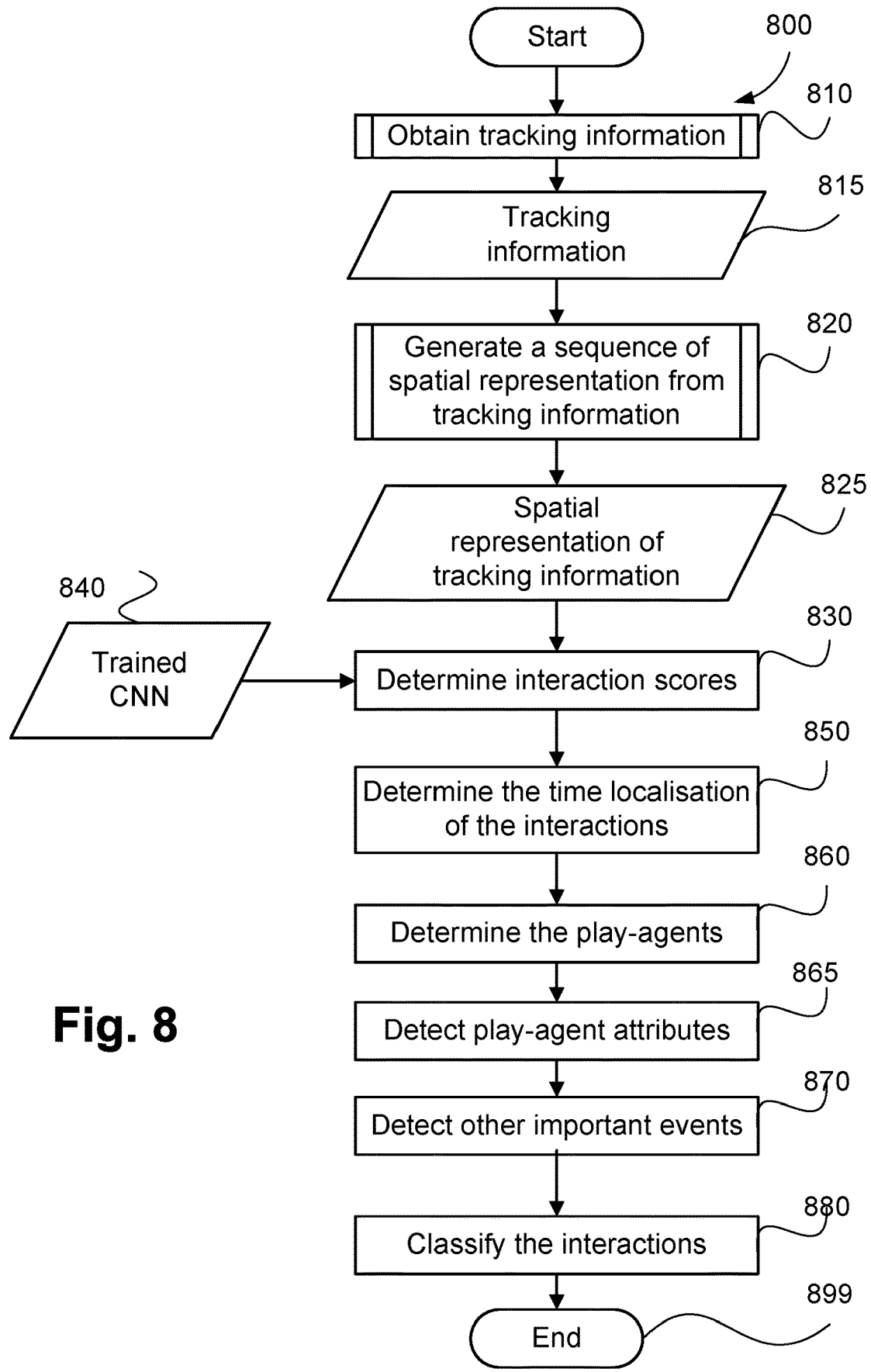
FIG. 8 shows a flow chart of a method of classifying interactions.

FIG. 8 shows a method 800 of interaction detection and classifying interactions in addition to determining their time localisation. The method 800 is a temporal localisation and classification method associated with one implementation of the methods described.

The method 800 is typically implemented as one or more modules of the application 1033, stored in the memory 1006 and controlled under execution of the processor 1005.

Similar to temporal localisation method 100, the temporal localisation and classification method 800 starts with an obtaining tracking information step 810. The step 810 operates in the same manner as the step 110 of FIG. 1 and generated tracking information 815 similar to information 115.

The method 800 proceeds from step 810 to a step 820 for generating a sequence of spatial representations. The step 820 operates in the same manner as step 120 of FIG. 1 and generates a spatial representation of tracking information 825 similar to 125. The method 800 proceeds from step 820 to a step 830. Step 830 operates to determine a sequence of interaction scores in a similar manner to step 130.

The method 800 progresses from step 840 to a temporal localisation step 850. The step 850 operates in the same manner as the step 150 and determines the time localisation of the interactions using the determined interaction scores.

The method 800 progresses from step 850 to determining step 860. The step 860 determines the play-agent of the interactions localised in temporal localisation step 850. In the context of the disclosure, the term play-agent refers to the agent or object (e.g., the person) who has initiated the interaction. For example, when a player 'A', passes a ball to a player 'B', player 'A' is referred to as the play-agent. Similarly in surveillance and safety and security applications, when the person 'A' passes a parcel to another person, the person 'A' who has initiated the interaction is called the play-agent.

In one arrangement, the play-agent selection step 860 determines the play-agent by using the distance between the relevant objects of interest. The distance between the objects of interest is calculated using the tracking information 815. For example, when analysing interactions in a team sport such as soccer, once the interactions are temporally localised, the player with the smallest distance from the ball (at the time of interaction) is selected as the play-agent of the corresponding interaction.

Once the play-agents of the interactions localised in step 850 are determined, the method 800 continues to a determining step 865. Attributes of the play agents are determined in the determination step 865. The attributes determined in the attribute determination step 865 are generally use-case dependent. In some implementations, the term 'high level features' is used instead of attributes. For example, in one arrangement for sport analytics, the attributes determined in the attribute determination step 865 include personal identifiers and field location, and team attributes such as team association identifiers and role identifiers. In an alternative implementation for surveillance, safety and security, the attributes may include personal identifier, location in the scene and role (such as customer, staff-member and security personnel).

The method 800 continues from step 865 to a detecting step 870. In some use-cases there could be some other events which are also important for analysing the interactions. For example, in sport analytics use-cases, other events such as ball going out of playing fields, ball getting into the goal area, and game being stopped are some examples of other important events. In surveillance, safety and security applications, events such as an 'alarm going off', 'train arriving', 'train departing', and 'end of work hours' are examples of some possibly import events. When there are some other events which are also important for the use-case, the event detection step 870 detects the other events, and determines their time localisation. The event detection step 870, otherwise, is an optional step if there are no events other than the interactions localised in step 850 which are important for the use-case under consideration.

The method 800 continues from step 870 to an interaction classification step 880. The interaction classification step 880 classifies the temporally localised interactions of step 850 using the attributes determined in the attribute determination step 865. In one arrangement, the interaction classification step utilises use-case specific rules to classify the interactions based on the determined attributes. For example, when the interaction localisation step 850 determines two consecutive interactions of the players with the ball at two distinct timestamps T1 and T2, the interaction classification step 880 classifies the players interactions as 'successful pass' when the difference between T2 and T1 is shorter than a few seconds, and the attributes determined in the attribute determination step 865 associated with the play-agent of the interactions at timestamp T1 and T2 indicates that the play-agents are two distinct players of the same team. Similarly, the players interaction is classified as 'failed pass', when the determined attributes indicates that the two associated play-agents are from opposing teams and none of them have goal keeper roles, or the interaction is classified as 'failed shoot' when the attributes of the play-agent associated with the interaction at timestamp T2 indicates that he/she is the goal-keeper of the opposite team.

An alternative arrangement may use statistical learning techniques such as decision-trees, multinomial logistic regression or support vector machine for interaction classification step 880. To use statistical learning technique, a training set to learn the statistical model is required, as similarly discussed in relation to step 190. A training set is typically a set of example instances, where each instance includes the attributes determined in the attribute determination step 865 and the ground truth annotation of the class of the interaction. When using statistical learning, the classification model is generally learned by minimising a cost function, where the cost is usually the sum of the classification loss from different instances in the training set. A cross entropy loss or Hinge loss are two examples of common loss functions used in statistical learning.

Yet, another arrangement uses a probabilistic temporal sequence model such as conditional Markov random (CRF) field, or a temporal sequence model such as long-short term memory (LSTM) network for interaction classification step 880. Conditional Markov random fields and long-short term memory systems are also statistical models, and can be trained using a training set. Methods to train a statistical classification model for the use-case of interest are known.

The arrangements described convert tracking information for video data to a spatial representation that can be used by a convolutional neural network to determine an interaction score, and from which temporal localization ca be determined. The arrangements described accordingly allow fine-grain detection of interactions that are computationally efficient and accurate in comparison to previous solutions.

The arrangements described are applicable to the computer and data processing industries and particularly for image processing industries associated with surveillance and sports broadcasting. The arrangements described are also relevant to the machine learning industries for identifying temporal occurrence of interactions from tracking data.

The foregoing describes only some embodiments of the present invention, and modifications and/or changes can be made thereto without departing from the scope and spirit of the invention, the embodiments being illustrative and not restrictive.

What is claimed is:
1. A method of detecting an interaction between a plurality of objects, the method comprising:
  receiving tracking information for the plurality of objects in a scene, the tracking information tracking the objects over a period of time;
  obtaining properties of interest of the objects;
  converting locations of the plurality of objects at different times in the tracking information to corresponding locations in spatial representations;
  generating a temporal sequence of spatial representations from the tracking information as a sequence of frames, each of the frames comprising an activation for each of the plurality of objects and representing a relative spatial relationship between the plurality of objects in the scene based on the properties of the objects;

generating, using a trained neural network, interaction scores associated with the sequence of objects frames over the time period from the generated sequence of frames using the activations and the relative spatial relationship between the objects, the interaction scores representing changes in the relative spatial relationship between the objects over time relating to the interaction; and detecting time localization of the interaction in the sequence of frames using the generated interaction scores.

2. The method according to claim 1, further comprising determining the tracking information of the plurality of objects from video data capturing the scene.

3. The method according to claim 1, wherein generating the sequence of frames comprises determining a mapping between video data of the scene and dimensions of the frames, and converting a location of each of the plurality of objects in the scene to a location in the dimensions of the frames.

4. The method of claim 3, wherein obtaining properties of interest of the objects comprises determining properties of each of the plurality of objects from the video data using an automated supervised search method.

5. The method according to claim 1, wherein determining the features associated with the plurality of objects relates to determining interaction scores associated with the plurality of frames over the time period.

6. The method according to claim 1, wherein detecting the time localisation comprises determining peaks in the interaction scores over a predefined threshold.

7. The method according to claim 1, further comprising classifying the interaction by determining a play agent of the interaction.

8. The method according to claim 7, wherein classifying the interaction further comprises determining attributes of the play agent.

9. The method according to claim 1, wherein the scene relates to a playing field, the plurality of objects relate to players of a team sport and a ball, and the interaction relates to interaction between the players and ball.

10. The method according to claim 1, further comprising generating an encoding for the properties of interest of the objects using properties of corresponding activations.

11. The method according to claim 10, wherein the properties of the plurality of objects are encoded using a size of the activation.

12. The method according to claim 10, wherein the properties of the plurality of objects are encoded using a shape of the activation.

13. The method according to claim 10, wherein the properties of the objects are encoded using a colour of the activation.

14. The method according to claim 10, wherein the sequence of frames are associated with a number of channels and the properties of the plurality of objects are encoded by mapping the corresponding activation to one or more of the channels.

15. The method according to claim 14, wherein the number of channels is three, represented by red, green and blue channels, such that the sequence of frames provides a visual representation of the plurality of objects, the visual representation being devoid of visual characteristics of the objects.

16. A method of detecting time localisation in an interaction between a plurality of objects, the method comprising:

receiving tracking information for the plurality of objects in a scene, the tracking information tracking the objects over a time period;

generating a temporal sequence of frames, each frame containing a visual representation of the received tracking information for each of the plurality of objects;

generating, using a trained neural network, interaction scores associated with the interaction from the generated sequence of frames using pixel information representing the relative spatial relationship between the plurality of objects in the generated sequence of frames; and detecting time localization in the interaction between the plurality of objects in the sequence of frames using the generated interaction scores.

17. A non-transitory computer readable storage medium storing program instructions for performing the method according to claim 15.

18. Apparatus for detecting an interaction between a plurality of objects, comprising:

a processor; and a memory device storing a software program for directing the processor to perform a method comprising the steps of:

receiving tracking information for the plurality of objects in a scene, the tracking information tracking the objects over a period of time;

obtaining properties of interest of the objects;

converting locations of the plurality of objects at different times in the tracking information to corresponding locations in spatial representations;

generating a temporal sequence of spatial representations from the tracking information as a sequence of frames, each of the frames comprising an activation for each of the plurality of objects and representing a relative spatial relationship between the plurality of objects in the scene based on the properties of the objects;

generating, using a trained neural network, interaction scores associated with the sequence of frames over the time period from the generated sequence of frames using the activations and the relative spatial relationship between the objects, the interaction scores representing changes in the relative spatial relationship between the objects over time relating to the interaction; and detecting time localization of the interaction in the sequence of frames using the generated interaction scores.

19. A system comprising:

a plurality of image capture devices for capturing video of a scene over a time period;

a processor; and a memory device storing a software program for directing the processor to perform a method comprising the steps of:

receiving the video data of the scene;

determining tracking information for a plurality of objects in the scene from the video data, the tracking information tracking the objects over a period of time;

obtaining properties of interest of the objects;

converting locations of the plurality of objects at different times in the tracking information to corresponding locations in spatial representations;

generating a temporal sequence of spatial representations from the tracking information as a sequence of frames, each of the frames comprising an activation for each of the plurality of objects and representing a relative spatial relationship between the plurality of objects in the scene based on the properties of the objects;

generating, using a trained neural network, interaction scores associated with the sequence of frames over the time period from the generated sequence of frames using the activations and the relative spatial relationship between the objects, the interaction scores representing changes in the relative spatial relationship between the objects over time relating to the interaction; and detecting time localization of the interaction in the sequence of frames using the generated interaction scores.

* * * * *